United States Patent
Hurd et al.

(10) Patent No.: US 11,214,898 B2
(45) Date of Patent: *Jan. 4, 2022

(54) MOISTURE MANAGEMENT SUPPORT GARMENT WITH A DENIER DIFFERENTIAL MECHANISM

(71) Applicant: NIKE, Inc., Beaverton, OR (US)

(72) Inventors: Rebecca P. Hurd, Tigard, OR (US); Susan L. Sokolowski, Portland, OR (US)

(73) Assignee: NIKE, INC., Beaverton, OR (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/674,822

(22) Filed: Nov. 5, 2019

(65) Prior Publication Data

US 2020/0063300 A1 Feb. 27, 2020

Related U.S. Application Data

(60) Division of application No. 15/495,209, filed on Apr. 24, 2017, now Pat. No. 10,501,873, which is a (Continued)

(51) Int. Cl.
*D04B 1/24* (2006.01)
*A41B 17/00* (2006.01)
(Continued)

(52) U.S. Cl.
CPC .............. *D04B 1/246* (2013.01); *A41B 17/00* (2013.01); *A41C 3/0057* (2013.01); *B32B 5/026* (2013.01);
(Continued)

(58) Field of Classification Search
CPC . A41B 17/00; A41B 2400/62; A41B 2500/10; A41C 3/0057; B32B 2250/20;
(Continued)

(56) References Cited

U.S. PATENT DOCUMENTS 4,537,822 A 8/1985 Nanri et al.
4,733,546 A 3/1988 Toda
(Continued)

FOREIGN PATENT DOCUMENTS

CN 103796538 A 5/2014
DE 3409965 A1 9/1985
(Continued)

OTHER PUBLICATIONS

Office Action received for European Patent Application No. 12734640.1, dated Jan. 10, 2020, 4 pages.
(Continued)

*Primary Examiner* — Arti Singh-Pandey
(74) *Attorney, Agent, or Firm* — Shook, Hardy & Bacon L.L.P.

(57) ABSTRACT

A moisture management fabric using denier differential to facilitate the movement of sweat away from the wearer's body is presented. An exemplary moisture management support garment constructed from an exemplary moisture management fabric is presented. An exemplary moisture management support garment is a moisture transporting sport bra. A denier differential is employed to provide superior moisture transporting and evaporation of perspiration from a wearer during exertion. The denier differential relies upon a facing layer and a back layer with substantially different yarn thickness and fabric porosity to achieve fluid transport.

20 Claims, 8 Drawing Sheets

Figure 1A:
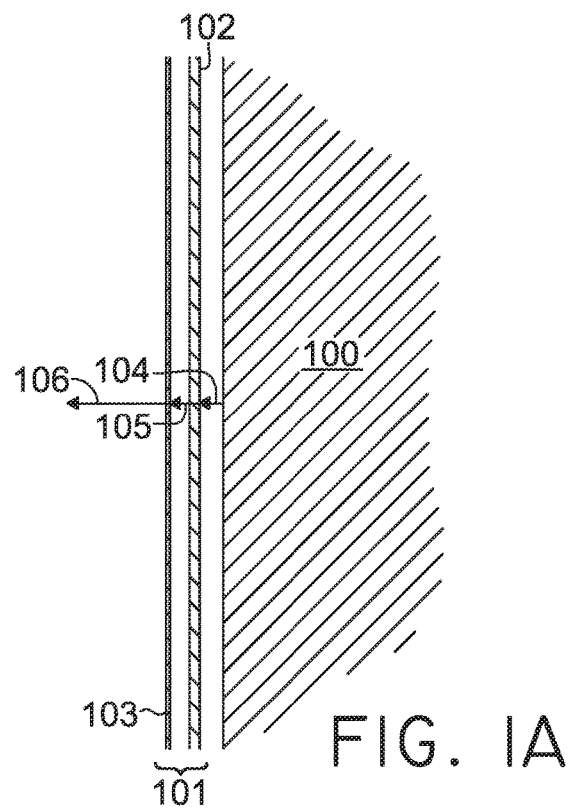

Related U.S. Application Data continuation of application No. 14/197,820, filed on Mar. 5, 2014, now Pat. No. 9,677,207, which is a division of application No. 12/987,235, filed on Jan. 10, 2011, now Pat. No. 8,702,469.

(51) Int. Cl.
  *A41C 3/00* (2006.01)
  *B32B 5/02* (2006.01)
  *B32B 5/26* (2006.01)
  *B32B 7/02* (2019.01)

(52) U.S. Cl.
  CPC .................. *B32B 5/26* (2013.01); *B32B 7/02* (2013.01); *A41B 2400/62* (2013.01); *A41B 2500/10* (2013.01); *B32B 2250/20* (2013.01); *B32B 2262/0261* (2013.01); *B32B 2262/0276* (2013.01); *B32B 2307/726* (2013.01); *B32B 2437/00* (2013.01); *Y10T 442/45* (2015.04); *Y10T 442/488* (2015.04)

(58) Field of Classification Search
  CPC .... B32B 2262/0261; B32B 2262/0276; B32B 2307/0276; B32B 2307/726; B32B 2437/00; B32B 5/026; B32B 7/02; C07D 209/08; C07D 209/12; C07D 209/18; C07D 405/12; C07D 405/14; C07D 487/04; D04B 1/246; Y10T 442/45; Y10T 442/448
  USPC ........ 450/1, 8, 19, 74–76, 92, 93; 2/69, 105, 2/106, 113; 442/489, 197, 239, 241, 246, 442/304, 308, 320, 312; 428/473.5, 428/474.4, 474.7, 480, 220, 213, 212
  See application file for complete search history.

(56) References Cited

U.S. PATENT DOCUMENTS

| | | | |
|---|---|---|---|
| 4,775,575 A | 10/1988 | Tang | |
| 5,364,701 A | 11/1994 | Boles et al. | |
| 5,441,436 A | 8/1995 | Moretz et al. | |
| 5,547,733 A | 8/1996 | Rock et al. | |
| 5,691,057 A | 11/1997 | Bennie et al. | |
| 5,823,012 A | 10/1998 | Hacskaylo | |
| 5,853,628 A | 12/1998 | Varona | |
| 5,928,971 A | 7/1999 | Ellis et al. | |
| 6,013,368 A | 1/2000 | Aneja | |
| 6,427,493 B1 | 8/2002 | Kasdan et al. | |
| 6,432,504 B1 | 8/2002 | Yeh | |
| 6,484,325 B1 | 11/2002 | Lazarus et al. | |
| 7,217,456 B1 | 5/2007 | Rock et al. | |
| 7,395,557 B1 | 7/2008 | Ledyard | |
| 7,430,883 B2 | 10/2008 | Sorensen | |
| 7,611,999 B2 | 11/2009 | McMurray | |
| 8,702,469 B2 | 4/2014 | Hurd et al. | |
| 8,719,962 B1 | 5/2014 | Huff | |
| 9,107,459 B2 | 8/2015 | Mayer et al. | |
| 9,677,207 B2 | 6/2017 | Hurd et al. | |
| 10,501,873 B2 | 12/2019 | Hurd et al. | |
| 2002/0022433 A1 | 2/2002 | Yeung et al. | |
| 2003/0130634 A1 | 7/2003 | Fenwick et al. | |
| 2004/0014394 A1 | 1/2004 | Mitchell et al. | |
| 2004/0171319 A1 | 9/2004 | Yoon | |
| 2005/0086721 A1 | 4/2005 | Lambertz | |
| 2005/0176324 A1 | 8/2005 | Michel | |
| 2006/0046616 A1 | 3/2006 | Alessi | |
| 2006/0063453 A1 | 3/2006 | King | |
| 2007/0093162 A1 | 4/2007 | Holcombe et al. | |
| 2007/0293106 A1 | 12/2007 | Harber | |
| 2008/0070477 A1 | 3/2008 | Barbour et al. | |
| 2008/0085646 A1 | 4/2008 | Prickett | |
| 2008/0096001 A1 | 4/2008 | Emden et al. | |
| 2008/0189824 A1 | 8/2008 | Rock et al. | |
| 2008/0222779 A1 | 9/2008 | McLaughlin | |
| 2008/0319521 A1 | 12/2008 | Norris et al. | |
| 2010/0101001 A1 | 4/2010 | Morris | |
| 2010/0167612 A1 | 7/2010 | Nadkarni et al. | |
| 2012/0174281 A1 | 7/2012 | Mayer et al. | |
| 2012/0178343 A1 | 7/2012 | Hurd et al. | |
| 2012/0222189 A1 | 9/2012 | Sokolowski et al. | |
| 2013/0061366 A1 | 3/2013 | Pezzimenti | |
| 2018/0055093 A1 | 3/2018 | Mayer et al. | |

FOREIGN PATENT DOCUMENTS

| | | |
|---|---|---|
| DE | 202006001380 U1 | 6/2006 |
| EP | 0777978 A2 | 6/1997 |
| EP | 0982119 A2 | 3/2000 |
| EP | 2177119 A2 | 4/2010 |
| GB | 2329191 A1 | 3/1999 |
| WO | 02088444 A1 | 11/2002 |

OTHER PUBLICATIONS

Intention to Grant received for European Patent Application No. 12734640.1, dated May 6, 2021, 8 pages.

Intention to Grant received for European Patent Application No. 12734640.1, dated Jul. 6, 2021, 4 pages.

Non-Final Office Action received for U.S. Appl. No. 15/805,846, dated Oct. 7, 2020, 4 pages.

Notice of Allowance received for U.S. Appl. No. 15/805,846, dated Sep. 20, 2021, 7 pages.

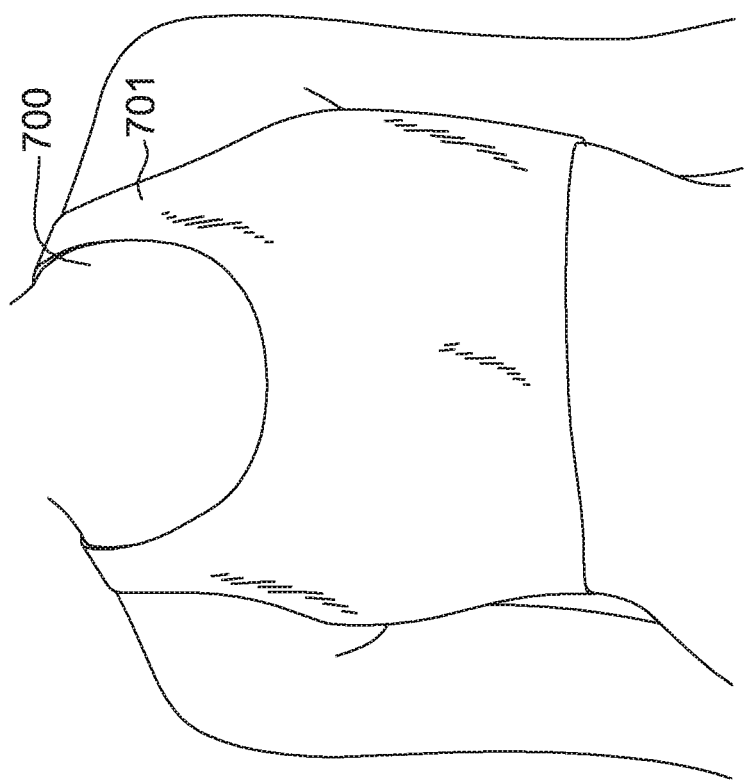

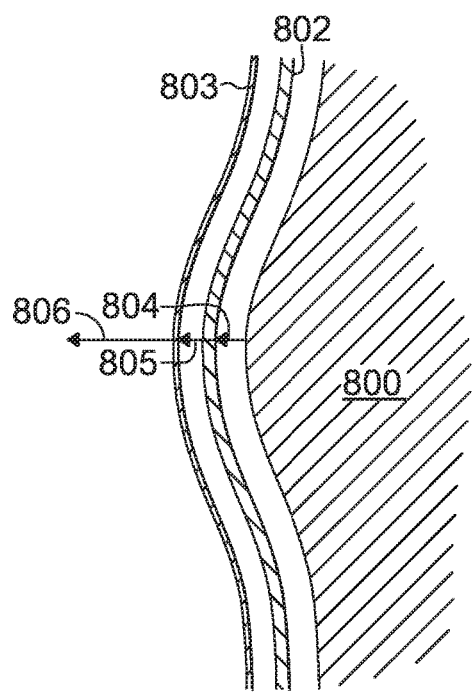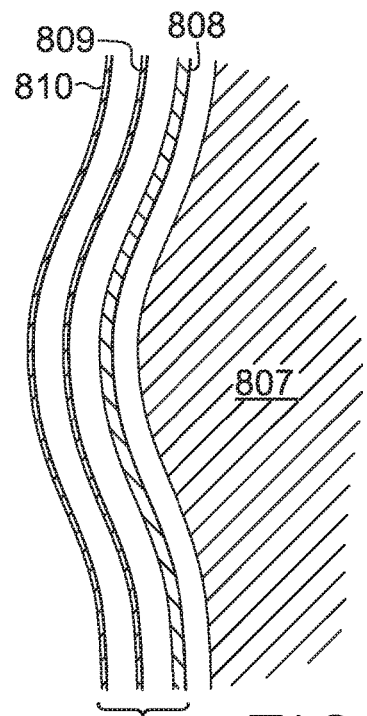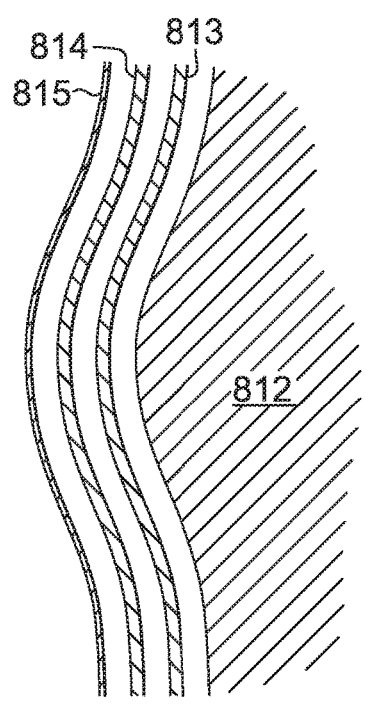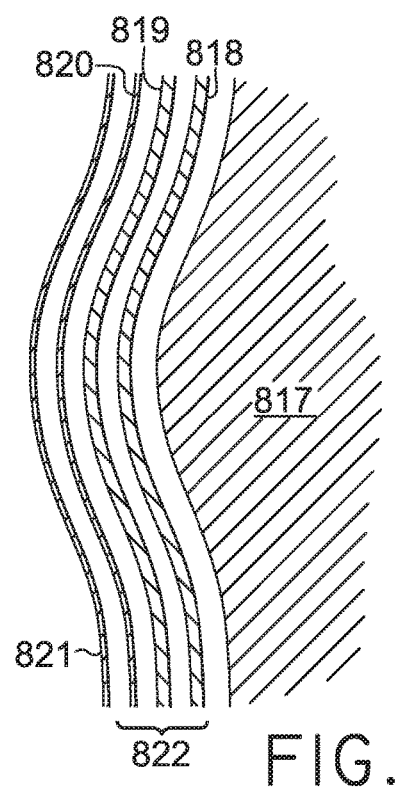

MOISTURE MANAGEMENT SUPPORT GARMENT WITH A DENIER DIFFERENTIAL MECHANISM

CROSS-REFERENCE TO RELATED APPLICATIONS

This application, having U.S. application Ser. No. 16/674,822, filed Nov. 5, 2019, entitled "Moisture Management Support Garment with a Denier Differential Mechanism," is a Divisional Application of U.S. application Ser. No. 15/495,209, filed Apr. 24, 2017, entitled "Moisture Management Support Garment With A Denier Differential Mechanism" and issued Dec. 10, 2019 as U.S. Pat. No. 10,501,873; which is a Continuation Application of U.S. application Ser. No. 14/197,820, filed Mar. 5, 2014, entitled "Moisture Management Support Garment With A Denier Differential Mechanism," and issued Jun. 13, 2017 as U.S. Pat. No. 9,677,207; which is a Divisional Application of U.S. application Ser. No. 12/987,235, filed Jan. 10, 2011, entitled "Moisture Management Support Garment With A Denier Differential Mechanism," and issued Apr. 22, 2014 as U.S. Pat. No. 8,702,469. Each of these is incorporated by reference in its entirety.

FIELD

The present disclosure relates to moisture management apparel for wear during exertion.

BACKGROUND

Sweat evaporation from a person's skin is one of the most important cooling mechanisms during exertion. Typically, in a given set of environmental conditions, a person will perspire at an increased rate with increasing exertion. Perspiration rate may be exacerbated by the fact that skin temperatures become progressively warmer with tighter fitting garments. Sweat saturated garments are not only uncomfortable to the wearer but can promote bacterial proliferation and adversely affect thermal regulation. Moisture management is the ability of a fabric to transport sweat away from the body in order to keep the wearer dry and comfortable.

SUMMARY

Accordingly, despite the improvements of known athletic garments, many approaches to moisture management rely upon material properties of textiles. A denier differential mechanism is presented herein, utilizing morphological properties of fibers and textiles, to provide moisture management properties. Denier differential refers to yarn of different denier or thickness on the face versus the back of a textile. A moisture management fabric may be engineered with two sides: a facing layer and a back layer. Surface tension and capillary forces drive the moisture from the wearer's skin to the back layer. Moisture then moves from the back layer to the facing layer due to increased surface area of the facing layer. Due to the increased surface area of the facing layer, moisture may be spread out with greater surface area to evaporate.

One example includes a moisture management support garment comprising a first fabric layer comprising a first yarn of a first denier per filament, wherein the first denier per filament is between 0.50 and 1.04, and a second fabric layer adjacent the first fabric layer comprising a second yarn of a second denier per filament greater than the first denier per filament, wherein the second denier per filament is between 1.04 and 3.50 and a denier differential between the first denier per filament and the second denier per filament is at least 0.54, wherein the second fabric layer is the inner most layer of the garment when the garment is worn. Additionally, the first yarn may be polyester and the second yarn may be polyester. In another example, the first yarn may be nylon and the second yarn may be polyester. The first fabric layer may be single-knit and the second fabric layer may also be single-knit. Alternatively, the first fabric layer and the second fabric layer are double-knit. In another example, the first fabric layer and the second fabric layer are plaited single-knit. Furthermore, the moisture management support garment may comprise a third fabric layer of a third yarn of a third denier per filament, wherein the third denier per filament is between 0.50 and 1.04 and the third fabric layer is disposed between the first fabric layer and the second fabric layer. The moisture management support garment may comprise a fourth fabric layer of a fourth yarn of a fourth denier per filament, wherein the fourth denier per filament is between 1.04 and 3.5 and the fourth fabric layer is disposed between the third fabric layer and the second fabric layer. In another example, the moisture management support ferment may comprise a fifth fabric layer of a fifth yarn of a fifth denier per filament, wherein the fifth denier per filament is between 1.04 and 3.5, wherein the fifth fabric layer is disposed between the first fabric layer and the second fabric layer. For example, the fifth denier per filament may be greater than the first denier per filament but less than or equal to the second denier per filament. Additional layers may have a denier per filament between the first denier per filament and the second denier per filament forming a denier per filament gradient. In another example, the first fabric layer may have a stretch of at least 30% and the second fabric layer may have a stretch of at least 30%.

An additional example includes a moisture management fabric comprising a first fabric layer comprising a first yarn of a first denier per filament, wherein the first denier per filament is less than or equal to 1.04, and a second fabric layer adjacent to the first fabric layer comprising a second yarn of a second denier per filament greater than the first denier per filament, wherein the second denier per filament is greater than or equal to 1.04 and a denier differential between the first denier per filament and the second denier per filament is at least 0.54. Furthermore, the first yarn may be polyester and the second yarn may be polyester. In one example, the first yarn may be nylon and the second yarn may be polyester. The first fabric layer may be single-knit and the second fabric layer may be single-knit. In another example, the first fabric layer and the second fabric layer may be either double-knit or plaited single-knit. Additionally, the first fabric layer may have a stretch of at least 30%. The second fabric layer may also have a stretch of at least 30%. The moisture management fabric may further comprise at least one additional fabric layer of a third yarn of a third denier per filament, wherein the at least one additional fabric layer is disposed between the first fabric layer and the second fabric layer. Additional layers may have a denier per filament between the first denier per filament and the second denier per filament forming a denier per filament gradient. In one example, the third denier per filament is less than or equal to 1.04. In another example, the third denier per filament is greater than 1.04. The moisture management fabric may further comprise at least one additional fabric layer of a fourth yarn of a fourth denier per filament, wherein the fourth denier per filament is greater than or equal to 1.04.

The moisture management fabric may further comprise at least one additional fabric layer of a fourth yarn of a fourth denier per filament, wherein the fourth denier per filament is less than or equal to 1.04.

Another example includes a moisture transporting sport bra comprising a facing layer, the facing layer comprising a first yarn of a first denier per filament, wherein the first denier per filament is between 0.50 and 1.04; and a back layer adjacent the facing layer, the back layer comprising a second yarn of a second denier per filament greater than the first denier per filament, wherein the second denier per filament is between 1.04 and 3.50 and a denier differential between the first denier per filament and the second denier per filament is at least 0.54, wherein the back layer is adjacent to the skin of a wearer when the moisture transporting sport bra is worn. In one example, the first yarn may be polyester and the second yarn may be polyester. In another example, the first yarn may be nylon and the second yarn may be polyester. Furthermore, the facing layer may be single-knit and the back layer may be single-knit. The facing layer and the back layer may be double-knit or plaited single knit. The moisture transporting sport bra may comprise a third fabric layer of a third yarn of a third denier per filament, wherein the third fabric layer is disposed between the facing layer and the back layer. Additional layers may have a denier per filament between the first denier per filament and the second denier per filament forming a denier per filament gradient. The third denier per filament may be less than or equal to 1.04. In another example, the third denier per filament may be greater than or equal to 1.04. For example, the third denier per filament may be greater than the first denier per filament but less than or equal to the second denier per filament. The third fabric layer and the facing layer may be double-knit and the back layer may be single-knit. The third fabric layer and the back layer are double-knit and the facing layer is single-knit. The moisture transporting sport bra may further comprise a fourth fabric layer of a fourth yarn of a fourth denier per filament, wherein the fourth denier per filament may be less than or equal to 1.04 and the fourth fabric layer may be disposed between the facing layer and the third fabric layer.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIGS. 1A-D are schematics of an exemplary denier differential fabric with an illustrative moisture path from the wearer's body surface to the exterior of the fabric and exemplary denier differential fabrics with one or more additional fabric layers.

Figure 2A:
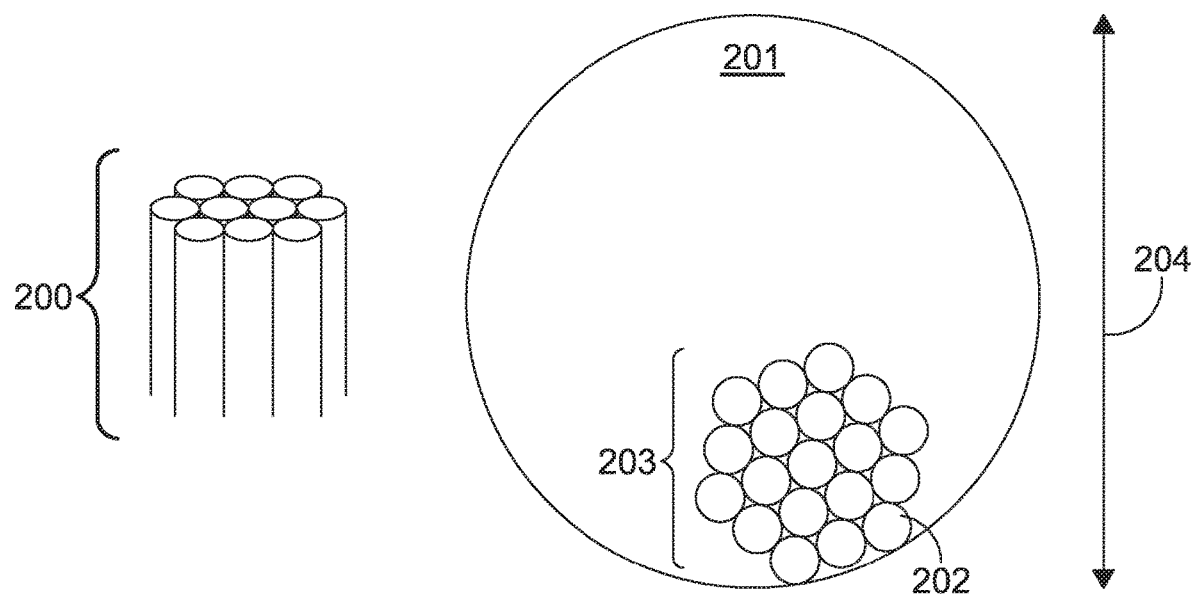
Figure 2B:
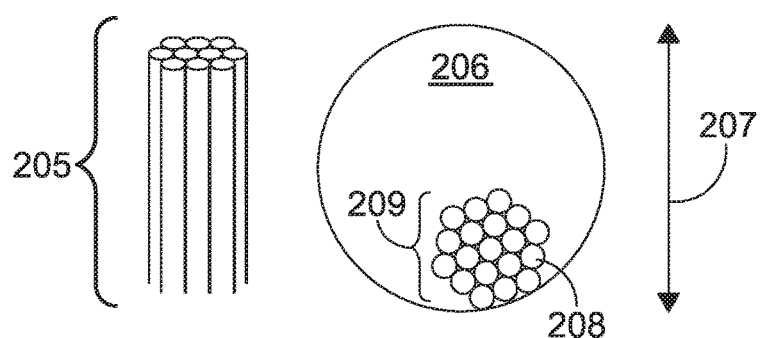

FIGS. 2A-B are illustrations of aspects of the yarns comprising a denier differential fabric.

Figure 3:
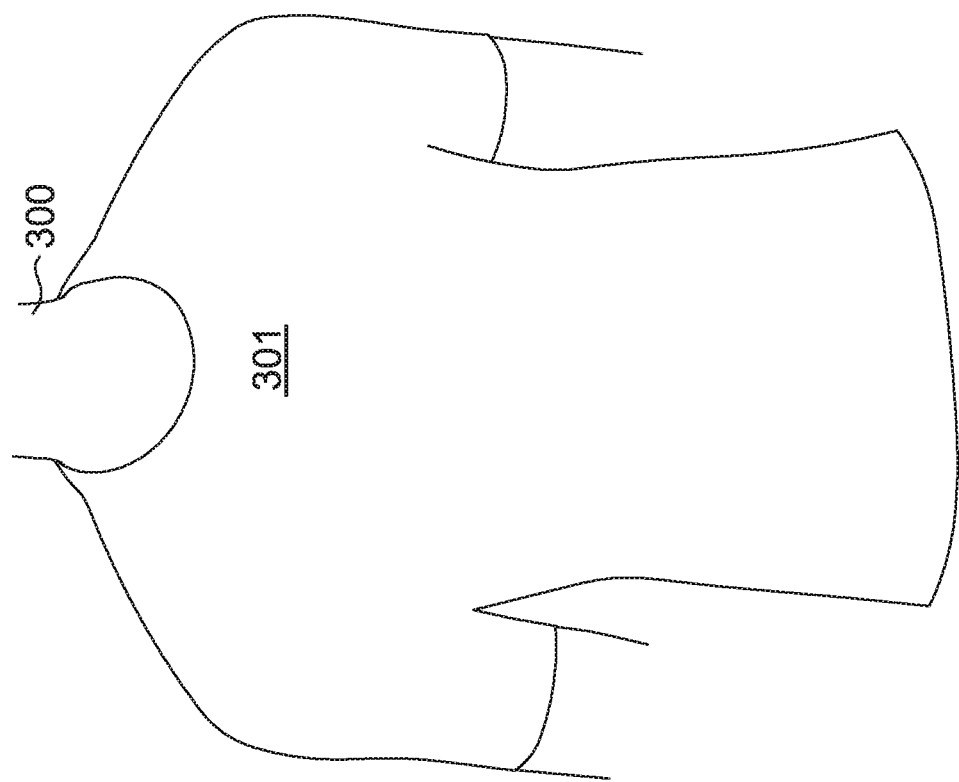

FIG. 3 is an illustration of an exemplary moisture management support garment.

Figure 4A:
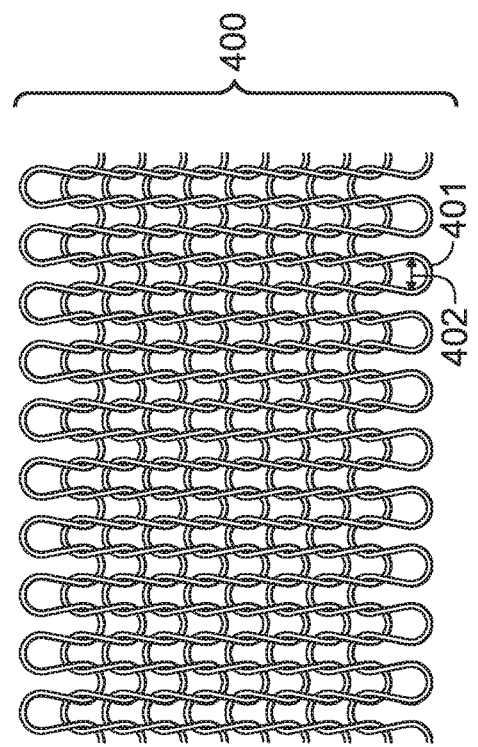
Figure 4B:
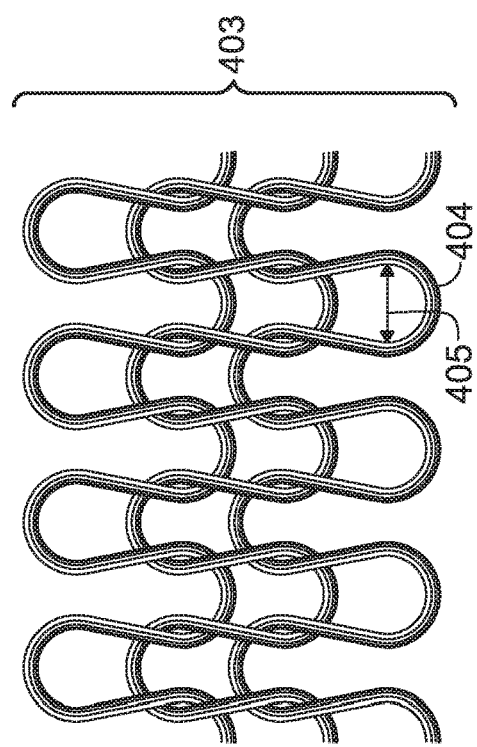

FIGS. 4A-B are schematics of an exemplary knitted fabric layer and an exemplary knitted fabric layer which may comprise a denier differential fabric.

Figure 5A:
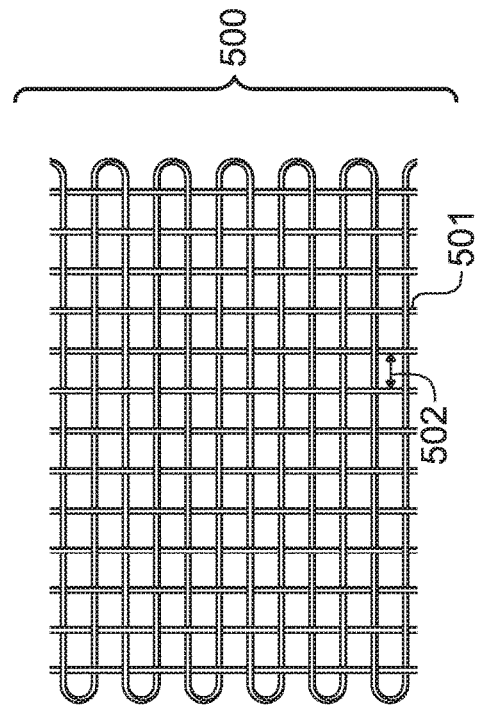
Figure 5B:
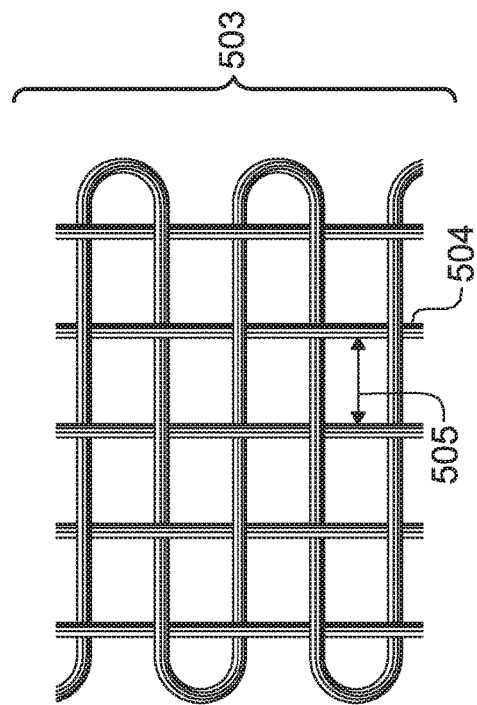

FIGS. 5A-B are schematics of an exemplary woven fabric layer and an exemplary woven fabric layer which may comprise a denier differential fabric.

FIGS. 6A-D are schematics of an exemplary moisture management support garment with an illustrative moisture path from the wearer's body surface to the exterior of the garment and further exemplary moisture management support garments including additional fabric layers.

FIG. 7 is an illustration of an exemplary moisture transporting sport bra.

FIG. 8A-D are schematics of an exemplary moisture transporting sport bra with an illustrative moisture path from the wearer's body surface to the exterior of the sport bra and exemplary moisture transporting sport bras with additional fabric layers.

Figure 9A:
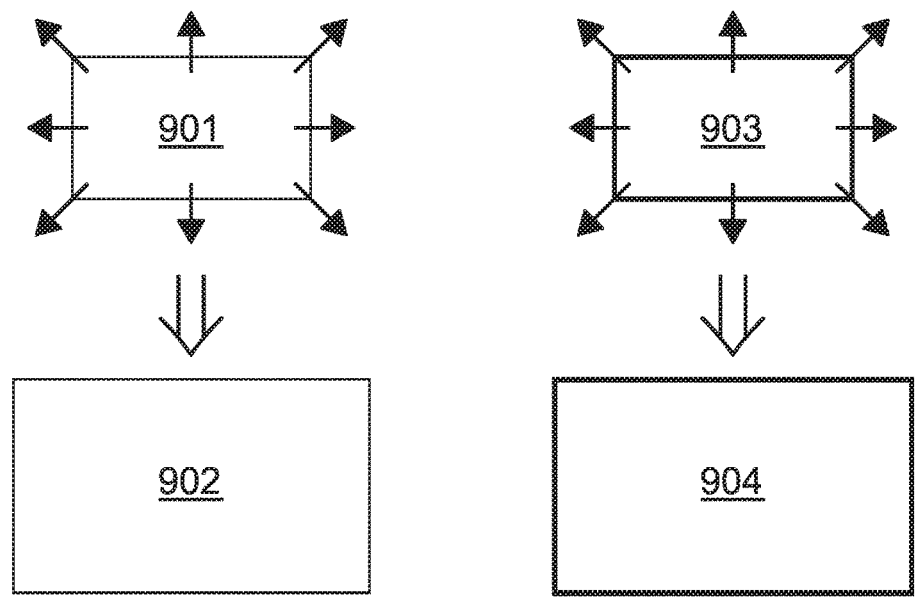
Figure 9B:
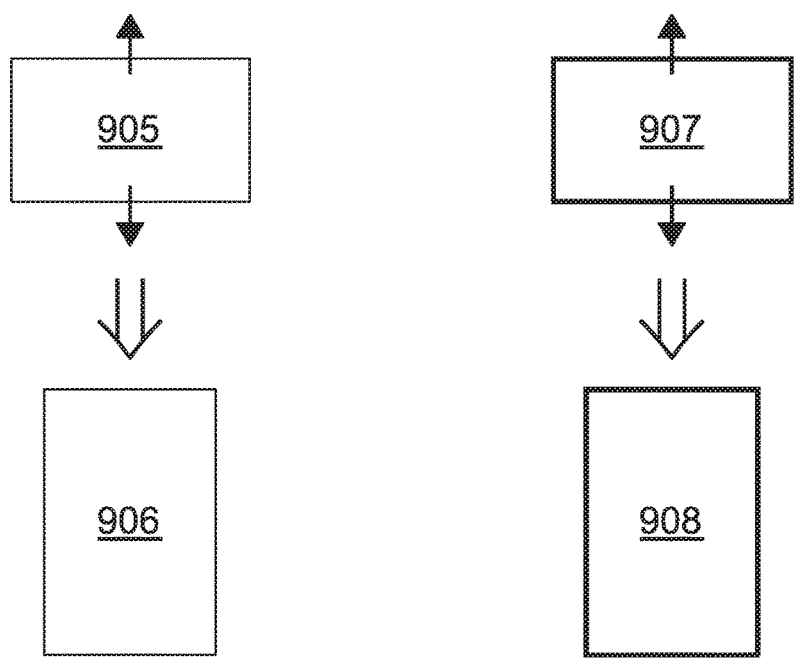

FIGS. 9A-B are illustrations of exemplary stretchable denier differential fabric.

Corresponding reference numerals indicate corresponding parts throughout the several views of the drawings.

DETAILED DESCRIPTION

Referring to FIG. 1A, an example of a moisture management fabric is depicted. The moisture management fabric 101 comprises two layers: a first fabric layer 103 and a second fabric layer 102. Additional aspects may include additional layers adjacent first or second fabric layer or both that may provide tailored levels of moisture management and support in a composite fabric. Both the first fabric layer 103 and second fabric layer 102 may be constructed of a yarn or thread.

The first fabric layer 103 and the second fabric layer 102 may be constructed separately, by knitting or weaving, and assembled to form the fabric. In another example, the layer 103 and the second fabric layer 102 may be constructed continuously, by knitting or weaving, to form a seamless fabric. The second fabric layer 102 is the layer adjacent to the wearer's body 100 and the first fabric layer 103 is adjacent to the second fabric layer 102. The wearer's body 100 perspires and moisture may be adsorbed 104 from the body 100 surface to the first fabric layer 103. The denier differential, which is discussed in greater detail below, between the first fabric layer 103 and the second fabric layer 102, can provide a difference in porosity and surface area wherein the first fabric layer 103 has a greater surface area and smaller pores than the second fabric layer 102. The smaller pores and greater surface area results in increased capillary force for aqueous solutions for the first fabric layer 103 than the second fabric layer 102. The denier differential produces wicking 105 from the second fabric layer 102 to the first fabric layer 103. The moisture, once transported to the first fabric layer 103, may be adsorbed to and spread out over the increased surface area of the first fabric layer 103. The increased surface area of the first fabric layer 103 can encourage moisture evaporation 106 from the first fabric layer 103. The moisture management fabric can thus transport moisture efficiently from the wearer 100, to the second fabric layer 102 to keep the wearer comfortable, and to the first fabric layer 103 to promote evaporation from the fabric to keep the wearer dry.

Figure 1B:
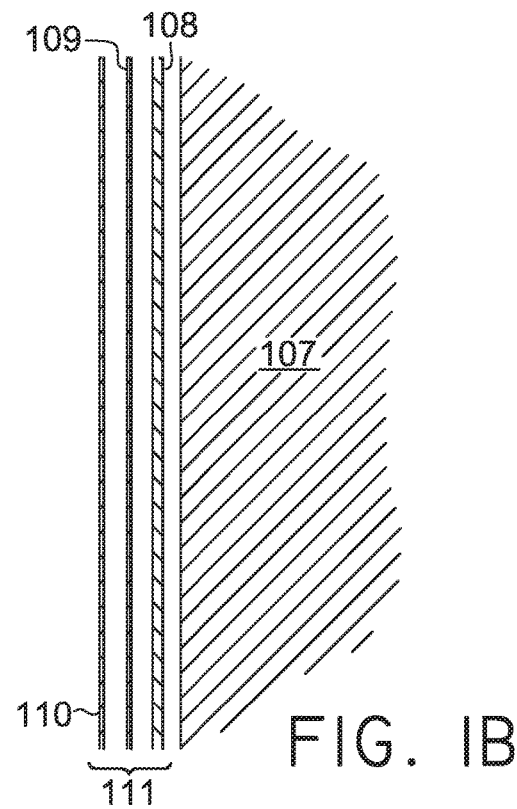
Figure 1C:
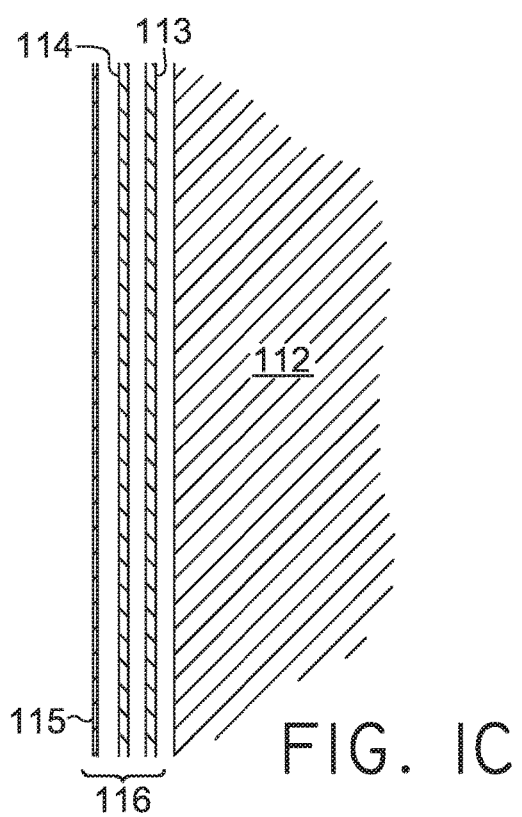
Figure 1D:
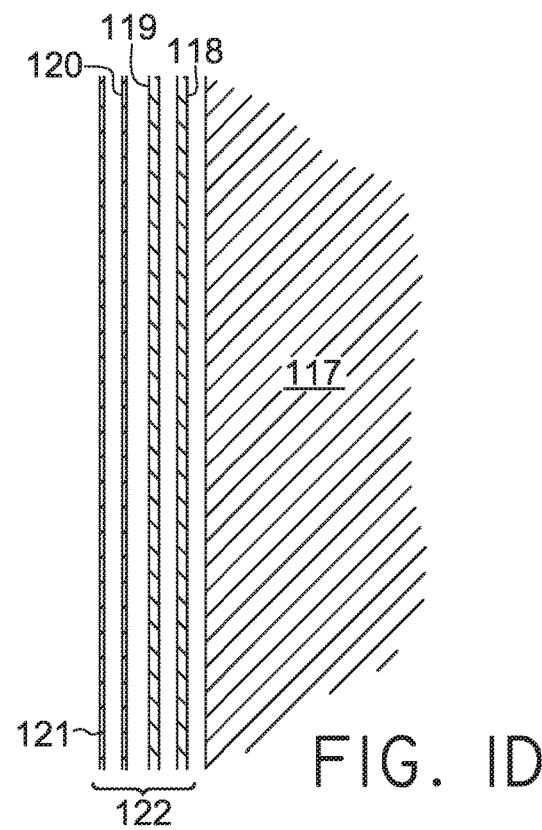

FIGS. 1B-D illustrate examples of a moisture management fabric with at least one additional fabric layer. FIG. 1B illustrates a third fabric layer 109 disposed between the first fabric layer 110 and the second fabric layer 108. In this example of a moisture management fabric, the third fabric layer 109 may be constructed by knitting or weaving a third yarn or thread. The first fabric layer may be constructed by knitting or weaving a first yarn and the second fabric layer may be constructed by knitting or weaving a second yarn. In FIG. 1B, the third fabric layer 109 may be constructed such that the porosity and surface area of the third fabric layer 109 is greater than the porosity and surface area of the second fabric layer 108. The third fabric layer 109 may be constructed by knitting or weaving third yarn of a third denier per filament, which is comparable in size to or larger than the first yarn. The denier per filament of the third fabric layer 109 may be greater than the denier per filament of the first fabric layer 110 and less than the denier per filament of the second fabric layer 108 such that a gradient of surface areas and porosities is provided. The first fabric layer and the third fabric layer may be knitted separately, double-knit, or plaited single-knit. The second fabric layer may be knitted separately. In another example, the third fabric layer and the second fabric layer may be knitted separately, double knit, or plaited single knit. The first fabric layer may be knitted separately.

FIG. 1C illustrates a moisture management fabric 116 having at least a third fabric layer 114 which is an intermediate layer of the fabric disposed between the first fabric layer 115 and the second fabric layer 113. In one example of a moisture management fabric 116, the third fabric layer 114 may be constructed by knitting or weaving a third yarn or thread. The first fabric layer 115 may be constructed by knitting or weaving a first yarn or thread; and the second fabric layer 113 may be constructed by knitting or weaving a second yarn or thread. In FIG. 1C, the third fabric layer 114 may be constructed such that the porosity and surface area of the third fabric layer 114 is less than the porosity and surface area of the first fabric layer 115. The third fabric layer 114 may be constructed by knitting or weaving a yarn or thread, which is comparable in size to or less than in size than yarn or thread of the second fabric layer 113. The denier per filament of the third fabric layer 114 may be greater than the denier per filament of the first fabric layer 115 and less than the denier per filament of the second fabric layer 113 such that a gradient of surface areas and porosities is provided. The first fabric layer 115 and the third fabric layer 114 may be knitted separately, double-knit, or plaited single-knit. The second fabric layer 113 may be knitted separately. In another example, the third fabric layer 114 and the second fabric layer 113 may be knitted separately, double knit, or plaited single knit. The first fabric layer 115 may be knitted separately.

FIG. 1D illustrates moisture management fabric 122 having at least a third fabric layer 120 and a fourth fabric layer 119 each of which is an intermediate layer of the fabric disposed between the first fabric layer 121 and the second fabric layer 118. In one example of a moisture management fabric, the third fabric layer 120 may be constructed by knitting or weaving a third yarn or thread. In one example of a moisture management fabric, the fourth fabric layer 119 may be constructed by knitting or weaving a third yarn or thread. The first fabric layer 121 may be constructed by knitting or weaving a first yarn or thread; and the second fabric layer 118 may be constructed by knitting or weaving a second yarn or thread. In FIG. 1D, the fabric 122 may be constructed such that the porosity and surface area of the third fabric layer 120 is less than the porosity and surface area of the first fabric layer 121 and the porosity and surface area of the fourth fabric layer 119 is greater than the porosity and surface area of the second fabric layer. In one example, the third fabric layer 120 has a porosity and surface area between that of the fourth fabric layer 119 and the first fabric layer 121; and the fourth fabric layer 119 has a porosity and surface area between that of the third fabric layer 120 and the second fabric layer. The first fabric layer 121, the second fabric layer 118, the third fabric layer 120, and the fourth fabric layer 119 may be woven or knitted separately. Alternatively, adjacent layers, such as the first fabric layer 121 and the third fabric layer 120, the third fabric layer 120 and the fourth fabric layer 119, the fourth fabric layer 119 and the second fabric layer 118 may be double-knit or plaited single-knit and combined with the remaining single, double-knit, or plaited single-knit layers.

Any combination of the examples illustrated in FIGS. 1A-D may be employed to achieve a moisture management fabric. Examples including a plurality of fabric layers may provide a gradient of surface areas and porosities for a composite fabric. In another example, additional fabric layers adjacent to the first fabric layer and second fabric layer may have similar porosity and surface area as the contacting first fabric layer and second fabric layer. In another example, a plurality of the above described fabric layers may provide a moisture management fabric with specific moisture management properties.

FIGS. 2A-B illustrate examples of the yarns that may be employed in the construction of the denier differential fabric. The yarns depicted in FIGS. 2A-B are not to scale and furthermore not limiting to yarns or fibers used in accordance with the invention. FIG. 2A illustrates an exemplary second yarn 201 that may be used to construct a moisture management support garment. The yarn may be a monofilament or multifilament yarn of any known synthetic or natural fiber. The yarn may be a filament yarn or a spun yarn. The exemplary second yarn 201 may be a bundle 203 of individual filaments 202. The total yarn size 204 may be measured in denier, for example 9,000 m of the exemplary yarn weighs X g has a size of X denier. The denier per filament is calculated by dividing the total yarn size (X denier) by the total number 200 of filaments 202. In FIG. 2B, an exemplary first yarn 206 may be used to construct a moisture management support garment. The exemplary first yarn 206 may be a bundle 209 of individual filaments 208 of any known synthetic or natural fiber. The exemplary first yarn 206 may have a size 207 represented as Y denier, for a first yarn 206 weighing Y g for 9,000 m. The denier per filament is calculated by dividing the total yarn size (Y denier) by the total number 205 of filaments 208. A yarn of less than or equal to 1.04 denier per filament may be a microfiber. The denier differential may be described as the difference in the denier per filament of the first yarn and the denier per filament of the second yarn. The first yarn 206 may be composed of nylon or polyester and the second yarn 201 may be composed of polyester. Moreover, surface treatment or additional modification may be employed to impart a greater relative hydrophobicity to the macrofiber or a great relative hydrophillicity to the microfiber. Not shown are third and fourth yarns which may also be a bundle of individual filaments or any known synthetic or natural fiber. Third and fourth yarns may also be measured in terms of a third and fourth denier per filament, respectively.

In one example, the first fabric layer may be knitted or woven of a first yarn of a first denier per filament of less than or equal to 1.04 denier per filament, preferably 0.50 to 1.04 denier per filament. The second fabric layer may be knitted or woven of a second yarn of a second denier per filament of greater than or equal to 1.04 denier per filament, preferably 1.04 to 3.50. The denier differential between the first yarn and the second yarn may be at least 0.54. The third fabric layer may be knitted or woven of a third yarn of a third denier per filament. In one example, the third denier per filament is less than or equal to 1.04 denier per filament, preferably 0.50 to 1.04 denier per filament. In another example, the third denier per filament is greater than or equal to 1.04, preferably 1.04 to 3.50. The third denier per filament may be a value less than the second denier per filament but greater than the first denier per filament. In another example, the fourth fabric layer may be knitted or woven of a fourth yarn of a fourth denier per filament. The fourth denier per filament may be less than or equal to 1.04 denier per filament, preferably 0.50 to 1.04 denier per filament. Alternatively, the fourth denier per filament may be greater than or equal to 1.04, preferably 1.04 to 3.50. The fourth denier per filament may be a value less than the second denier per filament but greater than the first denier per filament.

Referring to FIG. 3, one example of a moisture management support garment 301 is illustrated. The moisture management fabric described previously may be used to construct any number of garments that are suitable for the applications of the wearer 300. The moisture management support garment 301 provides improved sweat wicking and evaporation during exertion. The moisture management support garment 301 may be constructed using any garment manufacturing means. Additionally, the moisture management support garment 301, while incorporating the denier differential mechanism, may employ other fabrics and materials to modify the performance parameters. For example, the moisture management support garment 301 may incorporate a plurality of fabric layers that employ that denier differential mechanism to form a composite garment that can have moisture management properties tailored to specific applications such as various sports or levels of exertion.

Referring to FIGS. 4A-B, one example of a first fabric layer 400 and second fabric layer 403 of an exemplary knitted moisture management support garment is illustrated. FIG. 4A depicts an exemplary knitted structure of the first yarn 401 to form a first knit 400 with relatively small pores 402 and high porosity. FIG. 4B also depicts an exemplary knitted structure of the corresponding second yarn 404 to form the second knit 403 with fewer pores 405 of greater size and lower porosity. The knits depicted in FIGS. 4A-B are not to scale and furthermore not limiting to the knitted structure of the fabric used in accordance with the present invention, for which any pattern or method of knitting may be employed. The first knit 400 and the second knit 403 may be single knit separately and joined to form the exemplary fabric. In one example, the first knit 400 and the second knit 403 may be a double-knit. Alternatively, the first knit 400 and the second knit 403 may be a plaited single knit.

Referring to FIGS. 5A-B, one example of a first fabric layer 500 and second fabric layer 503 of an exemplary woven moisture management support garment is illustrated. FIG. 5A depicts an exemplary woven structure of the first yarn 501 to form a first weave 500 with relatively small pores 502 and high porosity. FIG. 5B also depicts an exemplary woven structure of the corresponding second yarn 504 to form the second weave 503 with fewer pores 505 of greater size and lower porosity. The woven structures depicted in FIGS. 5A-B are not to scale and furthermore not limiting to the woven structure of the fabric used in accordance with the present invention, for which any pattern or method of weaving may be employed.

FIG. 6A-6D an example of a moisture management support garment is depicted. The moisture management support garment 601 comprises two layers: a first fabric layer 603 and a second fabric layer 602. Additional examples may include additional layers adjacent first or second fabric layer or both that may provide tailored levels of moisture management and support in a composite fabric. Both the first fabric layer 603 and second fabric layer 602 may be constructed of a yarn or thread. The first fabric layer 603 may be constructed of a first yarn having a denier per filament of less than or equal to 1.04. The second fabric layer 602 may be constructed of a second yarn or thread of greater than or equal to 1.04. The denier differential between the first yarn and the second yarn may be at least 0.54.

The first fabric layer 603 and the second fabric layer 602 may be constructed separately, by knitting or weaving, and assembled to form the fabric. In another example, the layer 603 and the second fabric layer 602 may be constructed continuously, by knitting or weaving, to form a seamless fabric. The second fabric layer 602 is the layer adjacent to the wearer's body 600 and the first fabric layer 603 is adjacent to the second fabric layer 602. The wearer's body 600 perspires and moisture may be adsorbed 604 from the body 600 surface to the first fabric layer 603. The denier differential between the first fabric layer 603 and the second fabric layer 602, can provide a difference in porosity and surface area wherein the first fabric layer 603 has a greater surface area and smaller pores than the second fabric layer 602. The smaller pores and greater surface area results in increased capillary force for aqueous solutions for the first fabric layer 603 than the second fabric layer 602. The denier differential produces wicking 605 from the second fabric layer 602 to the first fabric layer 603. The moisture, once transported to the first fabric layer 603, may be adsorbed to and spread out over the increased surface area of the first fabric layer 603. The increased surface area of the first fabric layer 603 can encourage moisture evaporation 606 from the first fabric layer 603. The moisture management support garment 601, which may be constructed of a moisture management fabric described above, can thus transport moisture efficiently from the wearer 600, to the second fabric layer 602 to keep the wearer comfortable, and to the first fabric layer 603 to promote evaporation from the garment to keep the wearer dry.

Figure 6A:
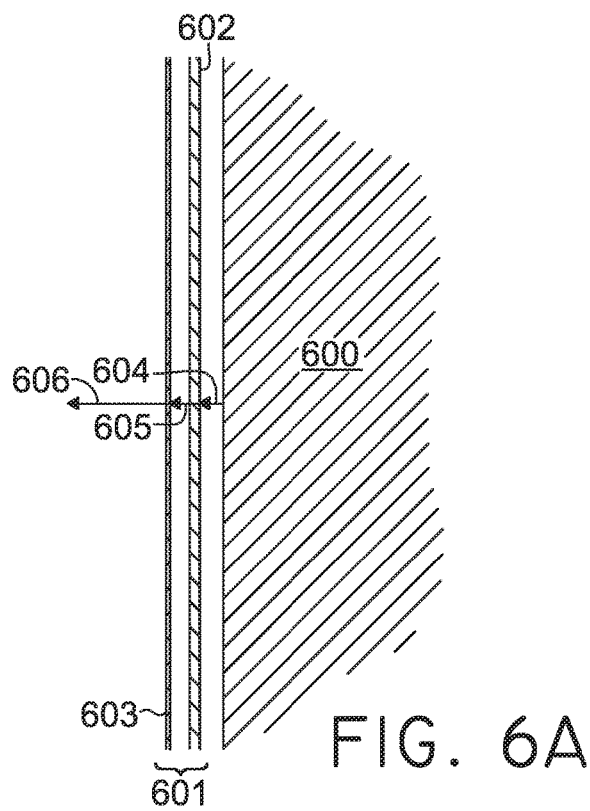
Figure 6B:
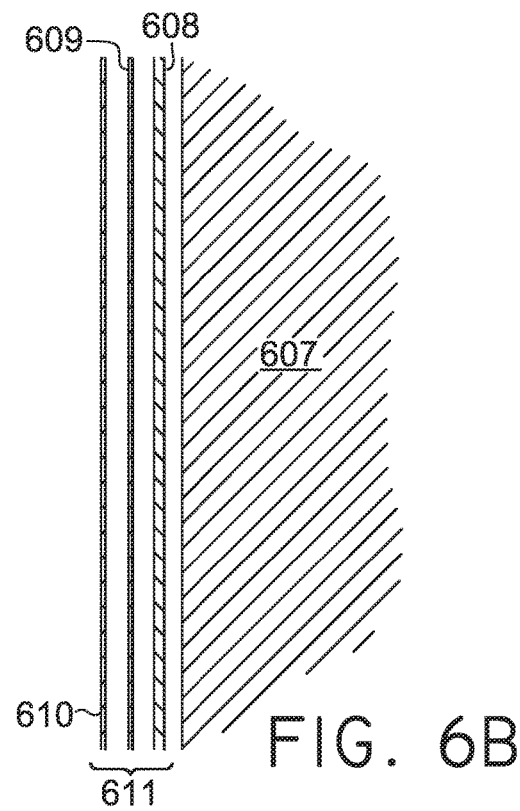
Figure 6C:
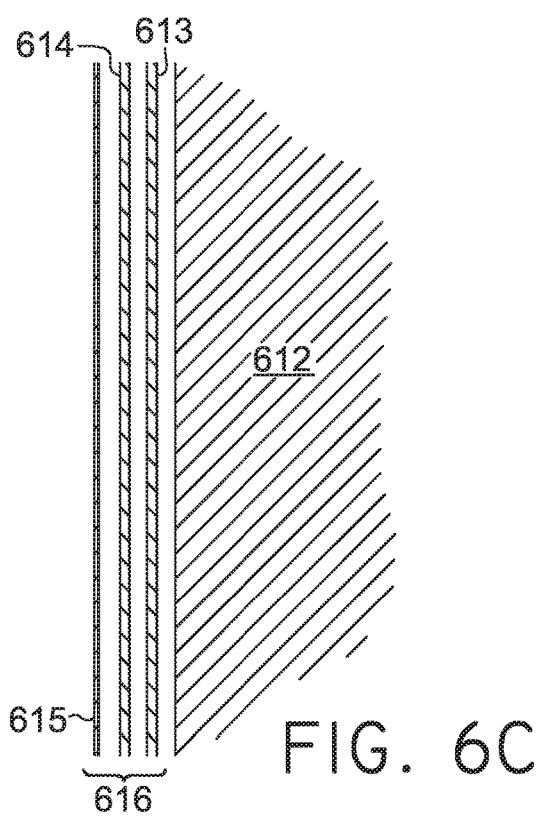
Figure 6D:
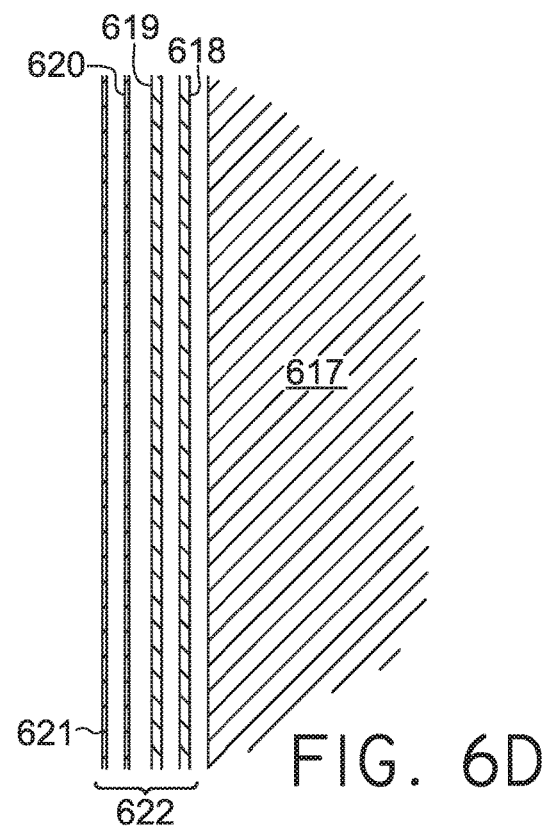

FIGS. 6B-D illustrate examples of moisture management support garment with at least one additional fabric layer. FIG. 6B illustrates a moisture management support garment 611 having at least a third fabric layer 609 disposed between the first fabric layer 610 and the second fabric layer 608. In this example of a moisture management support garment, the third fabric layer 609 may be constructed by knitting or weaving a third yarn or thread. The first fabric layer may be constructed by knitting or weaving a first yarn and the second fabric layer may be constructed by knitting or weaving a second yarn.

In FIG. 6B, the third fabric layer 609 may be constructed such that the porosity and surface area of the third fabric layer 609 is greater than the porosity and surface area of the second fabric layer 608. The third fabric layer 609 may be constructed by knitting or weaving third yarn of a third denier per filament, which is comparable in size to or larger than the first yarn. The third fabric layer 609 may be constructed of a yarn having a denier per filament of less than or equal to 1.04. For example, the denier per filament of the third fabric layer may be greater than the denier per filament of the first fabric layer 610 but less than the denier per filament of the second fabric layer 608 thereby forming a gradient of surface areas and porosities. The first fabric layer and the third fabric layer may be knitted separately, double-knit, or plaited single-knit. The second fabric layer may be knitted separately. In another example, the third fabric layer and the second fabric layer may be knitted separately, double knit, or plaited single knit. The first fabric layer may be knitted separately.

FIG. 6C illustrates a moisture management support garment 616 having at least a third fabric layer 614 which is an intermediate layer of the garment disposed between the first fabric layer 615 and the second fabric layer 613. In one example of a moisture management support garment 616, the third fabric layer 614 may be constructed by knitting or weaving a third yarn or thread. The third fabric layer 614 may be constructed of a third yarn having a denier per filament of greater than or equal to 1.04. The first fabric layer 615 may be constructed by knitting or weaving a first yarn or thread; and the second fabric layer 613 may be constructed by knitting or weaving a second yarn or thread.

In FIG. 6C, the third fabric layer 614 may be constructed such that the porosity and surface area of the third fabric layer 614 is less than the porosity and surface area of the first fabric layer 615. The third fabric layer 614 may be constructed by knitting or weaving a yarn or thread, which is comparable or smaller in size to yarn or thread of the second fabric layer 613. For example, the denier per filament of the third fabric layer 614 may be greater than the denier per filament of the first fabric layer 615 but less than the denier per filament of the second fabric layer 613 thereby forming a gradient of surface areas and porosities. The first fabric layer 615 and the third fabric layer 614 may be knitted separately, double-knit, or plaited single-knit. The second fabric layer 613 may be knitted separately. In another example, the third fabric layer 614 and the second fabric layer 613 may be knitted separately, double knit, or plaited single knit. The first fabric layer 615 may be knitted separately.

FIG. 6D illustrates a moisture management support garment 622 having at least a third fabric layer 620 and a fourth fabric layer 619, each of which is an intermediate layer of the garment disposed between the first fabric layer 621 and the second fabric layer 618. In one example of a moisture management support garment 622, the third fabric layer 620 may be constructed by knitting or weaving a third yarn or thread. In one example of a moisture management support garment 622, the fourth fabric layer 619 may be constructed by knitting or weaving a third yarn or thread. The first fabric layer 621 may be constructed by knitting or weaving a first yarn or thread; and the second fabric layer 618 may be constructed by knitting or weaving a second yarn or thread.

In FIG. 6D, the moisture management support garment 622 may be constructed such that the porosity and surface area of the third fabric layer 620 is less than the porosity and surface area of the first fabric layer 621 and the porosity and surface area of the fourth fabric layer 619 is greater than the porosity and surface area of the second fabric layer. In one example, the third fabric layer 620 is constructed of a yarn having a denier per filament of less than or equal to 1.04 and the fourth fabric layer 619 is constructed of a yarn having a denier per filament of greater than or equal to 1.04. In one example, the third fabric layer 620 has a porosity and surface area between that of the fourth fabric layer 619 and the first fabric layer 621; and the fourth fabric layer 619 has a porosity and surface area between that of the third fabric layer 620 and the second fabric layer. The first fabric layer 621, the second fabric layer 618, the third fabric layer 620, and the fourth fabric layer 619 may be woven or knitted separately. Alternatively, adjacent layers, such as the first fabric layer 621 and the third fabric layer 620, the third fabric layer 620 and the fourth fabric layer 619, the fourth fabric layer 619 and the second fabric layer 618 may be double-knit or plaited single-knit and combined with the remaining single, double-knit, or plaited single-knit layers.

Any combination of the examples illustrated in FIGS. 6A-D may be employed to achieve a moisture management support garment. Examples including a plurality of fabric layers may provide a gradient of surface areas and porosities for a composite garment. In another example, additional fabric layers adjacent to the first fabric layer and second fabric layer may have similar porosity and surface area as the contacting first fabric layer and second fabric layer. In another example, a plurality of the above described fabric layers may provide a garment of specific moisture management properties.

FIG. 7 is an instance wherein the moisture management support garment may be a moisture transporting sport bra 701 worn close to and conformally by the wearer 700. The moisture transporting sport bra 701 provides mechanical support to the wearer while allowing improved sweat wicking and evaporation during exertion. The moisture transporting sport bra 701 may be constructed using any garment manufacturing means. Additionally, the moisture transporting sport bra 701, while incorporating the denier differential mechanism, may employ other fabrics and materials to modify the performance parameters. For example, the moisture transporting sport bra 701 may incorporate a plurality of fabric layers that employ that denier differential mechanism to form a composite sport bra that can have moisture management properties tailored to specific applications such as various sports or levels of exertion.

FIG. 8A-8D illustrate examples of a moisture transporting sport bra. The moisture transporting sport bra may be constructed of the moisture transporting fabric described above. The moisture transporting sport bra 801 comprises two layers: a facing layer 803 and a back layer 802. Additional examples may include additional layers adjacent facing or back layer or both that may provide tailored levels of moisture management and support in a composite fabric. Both the facing layer 803 and back layer 802 may be constructed of a yarn or thread. The facing layer 803 may be constructed of a first yarn having a denier per filament of less than or equal to 1.04, preferably between 0.50 and 1.04 denier per filament. The back layer 802 may be constructed of a second yarn or thread of greater than or equal to 1.04, preferably between 1.04 and 3.50 denier per filament. The denier differential between the first yarn and the second yarn may be at least 0.54.

The facing layer 803 and the back layer 802 may be constructed separately, by knitting or weaving, and assembled to form the fabric. In another example, the facing layer 803 and the back layer 802 may be constructed continuously, by knitting or weaving, to form a seamless fabric. The back layer 802 is the layer adjacent to the wearer's body 800 and the facing layer 803 is adjacent to the back layer 802. The wearer's body 800 perspires and moisture may be adsorbed 804 from the body 800 surface to the facing layer 803. The denier differential between the facing layer 803 and the back layer 802 can provide a difference in porosity and surface area wherein the facing layer 803 has a greater surface area and smaller pores than the back layer 802. The smaller pores and greater surface area results in increased capillary force for aqueous solutions for the facing layer 803 than the back layer 802. The denier differential produces wicking 805 from the back layer 802 to the facing layer 803. The moisture, once transported to the facing layer 803, may be adsorbed to and spread out over the increased surface area of the facing layer 803. The increased surface area of the facing layer 803 can encourage moisture evaporation 808 from the facing layer 803. The moisture transporting sport bra 801, which may be constructed of a moisture management fabric described above, can thus transport moisture efficiently from the wearer 800, to the back layer 802 to keep the wearer comfortable, and to the facing layer 803 to promote evaporation from the moisture management sport bra to keep the wearer dry.

FIGS. 8B-D illustrate examples of moisture transporting sport bra with at least one additional fabric layer. FIG. 8B illustrates a moisture transporting sport bra 811 having at least a third fabric layer 109 disposed between the facing layer 810 and the back layer 808. In this example of a moisture transporting sport bra, the third fabric layer 809 may be constructed by knitting or weaving a third yarn or thread. The facing layer may be constructed by knitting or weaving a first yarn and the back layer may be constructed by knitting or weaving a second yarn.

In FIG. 8B, the third fabric layer 809 may be constructed such that the porosity and surface area of the third fabric layer 809 is greater than the porosity and surface area of the back layer 808. The third fabric layer 809 may be constructed by knitting or weaving third yarn of a third denier per filament, which is comparable in size to the first yarn. The third fabric layer 809 may be constructed of a yarn having a denier per filament or less than or equal to 1.04. The facing layer and the third fabric layer may be knitted separately, double-knit, or plaited single-knit. The back layer may be knitted separately. In another example, the third fabric layer and the back layer may be knitted separately, double knit, or plaited single knit. The facing layer may be knitted separately.

FIG. 8C illustrates a moisture transporting sport bra 818 having at least a third fabric layer 814 which is an intermediate layer of the moisture management sport bra disposed between the facing layer 815 and the back layer 813. In one example of a moisture transporting sport bra 818, the third fabric layer 814 may be constructed by knitting or weaving a third yarn or thread. The third fabric layer 814 may be constructed of a third yarn having a denier per filament of greater than or equal to 1.04. The facing layer 815 may be constructed by knitting or weaving a first yarn or thread; and the back layer 813 may be constructed by knitting or weaving a second yarn or thread.

In FIG. 8C, the third fabric layer 814 may be constructed such that the porosity and surface area of the third fabric layer 814 is less than the porosity and surface area of the facing layer 815. The third fabric layer 814 may be constructed by knitting or weaving a yarn or thread, which is comparable in size to yarn or thread of the back layer 813. The facing layer 815 and the third fabric layer 814 may be knitted separately, double-knit, or plaited single-knit. The back layer 813 may be knitted separately. In another example, the third fabric layer 814 and the back layer 813 may be knitted separately, double knit, or plaited single knit. The facing layer 815 may be knitted separately.

FIG. 8D illustrates a moisture transporting sport bra 822 having at least a third fabric layer 820 and a fourth fabric layer 819, each of which is an intermediate layer of the moisture management sport bra disposed between the facing layer 821 and the back layer 818. In one example of a moisture transporting sport bra 822, the third fabric layer 820 may be constructed by knitting or weaving a third yarn or thread. In one example of a moisture transporting sport bra 822, the fourth fabric layer 819 may be constructed by knitting or weaving a third yarn or thread. The facing layer 821 may be constructed by knitting or weaving a first yarn or thread; and the back layer 818 may be constructed by knitting or weaving a second yarn or thread.

In FIG. 8D, the moisture transporting sport bra 822 may be constructed such that the porosity and surface area of the third fabric layer 820 is equal to or less than the porosity and surface area of the facing layer 821 and the porosity and surface area of the fourth fabric layer 819 is greater than or equal to the porosity and surface area of the back layer. The sport bra 822 to may constructed such that a gradient of surface area from greatest to smallest goes from facing layer 821 to back layer 818 with intermediate layers having intermediate and graduated surface areas. Additional layers inserted between the facing layer 821 and the back layer 818 may provide a gradient of surface area and porosity. In one example, the third fabric layer 820 is constructed of a yarn having a denier per filament of less than or equal to 1.04 and the fourth fabric layer 819 is constructed of a yarn having a denier per filament of greater than or equal to 1.04. In one example, the third fabric layer 820 has a porosity and surface area between that of the fourth fabric layer 819 and the facing layer 821; and the fourth fabric layer 819 has a porosity and surface area between that of the third fabric layer 820 and the back layer. The facing layer 821, the back layer 818, the third fabric layer 820, and the fourth fabric layer 819 may be woven or knitted separately. Alternatively, adjacent layers, such as the facing layer 821 and the third fabric layer 820, the third fabric layer 820 and the fourth fabric layer 819, the fourth fabric layer 819 and the back layer 818 may be double-knit or plaited single-knit and combined with the remaining single, double-knit, or plaited single-knit layers.

Any combination of the examples illustrated in FIGS. 8A-D may be employed to achieve a moisture transporting sport bra. Examples including a plurality of fabric layers may provide a gradient of surface areas and porosities for a composite moisture management sport bra. In another example, additional fabric layers adjacent to the facing layer and back layer may have similar porosity and surface area as the contacting facing layer and back layer. In another example, a plurality of the above described fabric layers may provide a moisture management sport bra of specific moisture management properties.

FIGS. 9A-B are schematics of aspects of the moisture management support garment wherein at least a portion of the garment can have a stretch of at least 30%, preferably 30% to 50%. Stretch may be imparted to a garment by knitting to produce an inherent stretch or by including a portion of stretchable material such as Spandex. Portions of an exemplary moisture management support garment may include regions of different stretch and rigidity to provide additional support. In another example, at least a portion of the moisture transporting sport bra can have a stretch of at least 30%, preferably 30% to 50%. The moisture transporting sports bra may include "locked out" areas such as the cup, shoulder strap, center-front, and wings that have different degrees of stretch in order to provide suitable support. In another example, at least a portion of the facing layer may have a stretch of at least 30%, preferably 30% to 50%. At least a portion of the corresponding back layer may have a stretch of at least 30%, preferably 30% to 50%. Examples may also include a facing layer and corresponding back layer with reduced or increased stretch to provide suitable support for various garment applications. Exemplary stretch may be achieved by knitting or employing elastic fibers. In an additional example, the facing layer may have a stretch of at least 30%, preferably 30% to 50%. The corresponding back layer may have a stretch of at least 30%, preferably 30% to 50%. Examples may also include a facing layer and a backing layer with regions of different stretch to provide suitable support for any garment application. As shown in FIG. 9A, portions of the facing layer or first layer 901 may stretch omni-directionally 902 and portions of the back layer or second layer 903 may stretch omni-directionally. As shown in FIG. 9B, portions of the facing layer or first layer 905 may stretch uni-axially 906 and portions of the back layer or second layer 907 may stretch uni-axially. A garment or fabric containing a plurality of layers disposed between the facing layer and back layer may have complementary or coordinating stretch imparted to the plurality of layers. Composite moisture management fabric and moisture management support garments may have layers of variable stretchability to tailor performance and fit of the product. Additional aspects may include any plurality of directional stretching in different regions of the garment and/or textile to provide suitable support for any garment application.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and may be used in a selected embodiment, even if not specifically shown or described.

What is claimed is:

1. A moisture management fabric used to form a garment, the moisture management fabric comprising:
    a first fabric layer comprising a first yarn having a first denier per filament;
    a second fabric layer configured to face a body surface when formed into the garment, the second fabric layer comprising a second yarn having a second denier per filament that is greater than the first denier per filament, wherein a denier per filament differential between the first denier per filament and the second denier per filament is at least 0.54; and
    a third fabric layer comprising a third yarn having a third denier per filament, wherein the third fabric layer is disposed between the first fabric layer and the second fabric layer.

2. The moisture management fabric of claim 1, wherein a denier per filament gradient is formed between the second fabric layer, the third fabric layer, and the first fabric layer.

3. The moisture management fabric of claim 1, wherein the second denier per filament is greater than the third denier per filament and the third denier per filament is greater than the first denier per filament.

4. The moisture management fabric of claim 1, wherein the third denier per filament is the same as the second denier per filament.

5. The moisture management fabric of claim 1, wherein the third denier per filament is the same as the first denier per filament.

6. The moisture management fabric of claim 1, wherein the first fabric layer, the second fabric layer, and the third fabric layer have a porosity and a surface area, the first fabric layer porosity and surface area being greater than the third fabric layer porosity and surface area, and the third fabric layer porosity and surface area being greater than the second fabric layer porosity and surface area.

7. The moisture management fabric of claim 1, wherein the first yarn, the second yarn, or the third yarn is polyester or nylon.

8. The moisture management fabric of claim 1, wherein at least one of the first fabric layer, the second fabric layer, or the third fabric layer is knitted with elastic fibers.

9. The moisture management fabric of claim 8, wherein the elastic fibers are knitted with the second yarn of the second fabric layer that is configured to face the body surface, such that the second fabric layer comprises a stretch of up to 50%.

10. The moisture management fabric of claim 9, wherein the stretch is 30% to 50%.

11. The moisture management fabric of claim 8, wherein the elastic fibers are knitted with the first yarn of the first fabric layer, such that the first fabric layer comprises a stretch of up to 50%.

12. The moisture management fabric of claim 11, wherein the stretch is 30% to 50%.

13. A moisture management fabric used to form a garment, the moisture management fabric comprising:
    a first fabric layer comprising a first yarn having a first denier per filament;
    a second fabric layer configured to face a body surface when formed into the garment, the second fabric layer comprising a second yarn having a second denier per filament that is greater than the first denier per filament, wherein a denier per filament differential between the first denier per filament and the second denier per filament is at least 0.54;
    a third fabric layer comprising a third yarn having a third denier per filament, wherein the third fabric layer is disposed between the first fabric layer and the second fabric layer; and
    a fourth fabric layer comprising a fourth yarn having a fourth denier per filament, wherein the fourth fabric layer is disposed between the second fabric layer and the third fabric layer.

14. The moisture management fabric of claim 13, wherein a denier per filament gradient is formed across the second fabric layer, the fourth fabric layer, the third fabric layer, and the first fabric layer.

15. The moisture management fabric of claim 13, wherein the second denier per filament is greater than the fourth denier per filament, the fourth denier per filament is greater than the third denier per filament, and the third denier per filament is greater than the first denier per filament.

16. The moisture management fabric of claim 13, wherein the first fabric layer, the second fabric layer, the third fabric layer, and the fourth fabric layer have a porosity and a surface area, the first fabric layer porosity and surface area being greater than the third fabric layer porosity and surface area, the third fabric layer porosity and surface area being greater than the fourth fabric layer porosity and surface area, and the fourth fabric layer porosity and surface area being greater than the second fabric layer porosity and surface area.

17. The moisture management fabric of claim 13, wherein at least one of the first fabric layer, the second fabric layer, the third fabric layer, or the fourth fabric layer is knitted with elastic fibers.

18. The moisture management fabric of claim 17, wherein the elastic fibers are knitted with the second yarn of the second fabric layer that is configured to face the body surface, such that the second fabric layer comprises a stretch of up to 50%.

19. The moisture management fabric of claim 17, wherein the elastic fibers are knitted with the first yarn of the first fabric layer, such that the first fabric layer comprises a stretch of up to 50%.

20. The moisture management fabric of claim 17, wherein the elastic fibers are knitted with the third yarn of the third fabric layer or the fourth yarn of the fourth fabric layer.

\* \* \* \* \*